Figure 1:
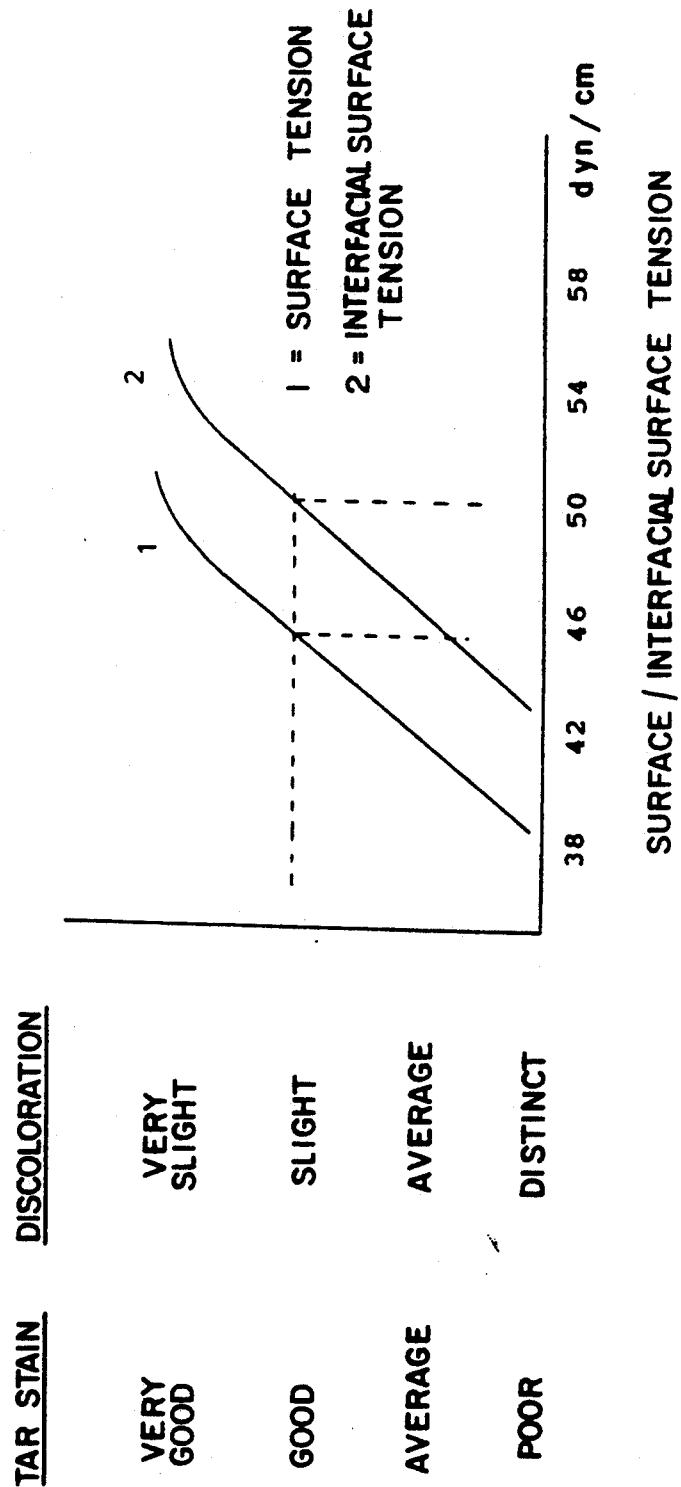

United States Patent

Saverin et al.

[11] Patent Number: 5,232,824
[45] Date of Patent: Aug. 3, 1993

[54] COATING MASS FOR THE BACK OF PHOTOGRAPHIC SUPPORT MATERIALS

[75] Inventors: Eckehard Saverin, Osnabruck; Hans-Udo Tyrakowski, Hasbergen, both of Fed. Rep. of Germany

[73] Assignee: Felix Schoeller Jr. GmbH & Co. K.G., Osnabruck, Fed. Rep. of Germany

[21] Appl. No.: 646,068

[22] Filed: Jan. 25, 1991

[30] Foreign Application Priority Data

Jan. 25, 1990 [EP] European Pat. Off. ........ 90101458.9

[51] Int. Cl.$^5$ .............................................. G03C 1/85
[52] U.S. Cl. .................................. 430/529; 430/523; 430/527
[58] Field of Search ...................... 430/529, 523, 527

[56] References Cited

U.S. PATENT DOCUMENTS 4,908,155  3/1990  Leemans et al. .................. 430/529
5,045,394  9/1991  Saverin et al. .................... 430/531

FOREIGN PATENT DOCUMENTS 0274017 10/1987  European Pat. Off. .
0312638 10/1987  European Pat. Off. .
3700183  1/1987  Fed. Rep. of Germany .

OTHER PUBLICATIONS

Patent Abstract of Japan, vol. 12, No. 422 (P-783) [3269] Nov. 9, 1988, JP-A-63-157149 Oji Paper Co. Ltd. Jun. 30, 1988.

Primary Examiner—Jack P. Brammer
Attorney, Agent, or Firm—Lockwood, Alex, Fitzgibbon & Cummings

[57] ABSTRACT

A coating mass for the production of a layer on the reverse side of photographic support materials of plastic foils or plastic coated papers is particularly distinguished by extraordinarily low dirt absorption and discoloration, even from greatly aged development baths. This is obtained through a mixture of colloidal aluminum modified silica, the alkali salt of an organic polyacid, a styrene/butadiene latex with a low content of free carboxyl groups and residual monomers, and a surface tension of >45 dyn/cm. The coating mass is so composed that the dried back coating has an interfacial surface tension of >50 dyn/cm.

10 Claims, 1 Drawing Sheet

COATING MASS FOR THE BACK OF PHOTOGRAPHIC SUPPORT MATERIALS

BACKGROUND, SUMMARY AND DESCRIPTION OF THE INVENTION

This invention relates to a back coating for photographic support materials and a coating mass for the production of such layer on a reverse side of support materials for light sensitive layers. These support materials can be present in the form of a plastic coated paper or in the form of a plastic foil. The reverse side is itself the surface of the support material which is placed opposite the front side which later bears the image.

Plastic foils or papers which are coated on their front and rear surfaces with polyolefin layers are generally used as supports for light sensitive layers, particularly for color photography. This polyolefin coating is preferably carried out in accordance with the process of extrusion coating and with the use of polyethylene. One such photographic support is described, for example, in U.S. Pat. No. 3,411,908.

By means of a two sided polyolefin coating, the base paper is protected against the penetration of developing, fixing and washing baths, and the image development can be carried out in a completely automatic manner, and in the shortest possible time. The polyolefins can be polyethlyenes, such as LDPE, LLDPE, HDPE, or polypropylene or mixtures of these components. They have many advantages as film formers. However, they also have characteristics which are disadvantageous in the context of the production or the further treatment of such papers. Apart from the problems of adhesion between the polyolefin surface and the light sensitive emulsions which can be eliminated by additional means and measures, during the course of the production and processing of such types of photographic papers the polyolefin layers must fulfill specific characteristics, and characteristics which the polyolefin has from the very beginning must be partially suppressed or bypassed.

For example, it may be necessary that the photographic materials which are to be developed be marked on the reverse side of the supports by means of writing or printing so they can thereby be assigned to specific clients and customers. However, a hydrophobic coating which consists of polyolefin which seals the paper core can only be written or printed on to a limited extent. Special means and measures are necessary so that a general ability to be printed on or written on can be ensured in the machine processing of photographic material which is formed as sheets. Corresponding proposals are described, for example, in the European patent disclosure No. 0,160,912.

Furthermore, it is necessary that no dirt particles are deposited on the surface of the photographic material ("tar stain") which is coated with light sensitive emulsions, during the developing process from the various treatment baths, such as developing and fixing baths. Such particles form over the course of time in aged photographic treatment baths as the result of oxidation and condensation processes.

In addition to such a partial absorption of dirt particles on the surface ("tar stain"), a fullsurface absorption of developer solution can also occur on the surface of the support material during the passage through the developing baths. This absorption may be so intense that it is no longer completely reversible during further passage through the treatment baths, particularly during the washing. This absorbed developer, or the absorbed components of the developer, oxidize in the air and lead to more or less severe yellowing of the entire surface.

It is furthermore necessary to prevent the developer solutions or baths from being contaminated by those agents which bring about the writeability, printability and such other types of desirable characteristics. This means that the back coating must have abrasion and water resistance.

One other requirement for such types of photographic support materials is a layer with good adhesion capacity for adhesive tapes. These adhesive tapes serve for the attachment of the photographic paper strips present for the attachment to one another in rolls. The adhesions should not dissolve during the passage through the aqueous bath liquids in the development process.

Finally, electrostatic charging of the support materials should be prevented as much as possible in order to avoid damaging exposure during the passage of the plastic coated photographic support material or a plastic foil through the emulsion casting machine or through the developing machines. Such damaging exposure would naturally lead to the non-usability of the light sensitive emulsion or to the destruction of the latent image which is to be developed.

In summary, a back coating should give the support material for light sensitive layers, which are either plastic foils or plastic coated base papers, the characteristics of writability, printability, adhesive tape adhesion, abrasion resistance and antistatic characteristics. However, the layer should not thereby contaminate the photographic treatment baths and should cause neither an absorption of dirt from tar-like oxidation products from the photographic developers nor a discoloration of the surface by the oxidized developer components.

It is known that the requirements on a back coating as described here require different measures, and it has previously been difficult to achieve these entirely because the means and measures offered for the solution frequently contradict each other.

It is thus known, for example, from the European patent disclosure No. 0 160 912 cited above, to provide such a photographic material coated with polyethylene on its reverse side with an antistatic layer which consists of a sodium magnesium silicate, a sodium polystyrene sulfonate and certain succinic acid semiesters. This layer should impede the electrostatic charge and, furthermore, protect the material against the absorption of dirt. However, it has been shown (comparative examples A–C in the German patent disclosure DE 3 700 183), that this layer shows a poor adhesive tape adhesion or a slight resistance to the baths.

Hydrophobic components in the surface coatings generally show high dirt absorption and slight antistatic effect, whereas hydrophilic components disadvantageously influence the adhesive tape adhesion, have poor printability, and when in the treatment baths, they loosen or swell up easily.

On the other hand, polar (hydrophilic) surfaces to be sure do generally exhibit good conductivity, and thus antistatic characteristics, as well as having a slight tendency to dirt absorption. With increasing polarity the abrasion resistance and the adhesive tape adhesion are disadvantageously influenced through the action of the photographic baths during the development process.

A photographic support material with a back coating which is a more capable compromise between various good characteristics, is described in DE-OS 3 700 183. It has good antistatic properties, good printability, average to good abrasion and resistance to the developing baths, slight to average dirt absorption, and good adhesive tape adhesion. This back coating is formed from:
A colloidal aluminum modified silica;
An alkali salt of an organic polyacid;
An acrylic acid alkylester copolymer with the following content:
  1-10 mol % of free carboxyl groups; and
  0-20% mol % of free hydroxyl groups; and
A trifunctional aziridin.
However, the photographic support material coated with this mixture has no capacity to be written on with pencil. Furthermore, it has been shown that the dirt absorption ("tar stain") in different oxidized photographic developers is still too high.

EP-OS 312 638 describes a photographic support material for light sensitive layers with a writable and printable reverse side layer similar to that in DE-OS 37 00 183. The layer is formed from the following:
A colloidal aluminum modified silicic acid;
An alkali salt of an organic polyacid;
Terpolymers from styrene/butadiene/methylmethacrylate; and
Course silica.
It provides good antistatic characteristics, adhesive tape adhesion, printability and resistance to brushing (bath resistance), and shows little "tar stain" and little discoloration of the surface by the oxidized developer components. In addition it has good pencil writability.

Both patent applications therefore contain colloidal aluminum modified silica and an alkali salt of an organic polyacid. They differ from one another through various latex binder types and through the fourth component, which is either a triazine or coarse grained silica.

DE-OS 37 00 183 requires an acrylic acid alkylester copolymer with free carboxyl groups, and preferably with free hydroxyl groups, as a binder. The aziridin serves for the crosslinking of the free carboxyl groups. The free carboxyl and hydroxyl groups increase the hydrophilia or polarity of the latex. In combination with the hydrophilic colloidal silica and the hydrophilic organic polyacid, a back coating develops which, in addition to the hydrophobic polymer chain of the latex, has a high portion of hydrophilic groups and components and thereby has a specific hydrophilia/hydrophobia ratio which is the cause of the generally good results. However, aziridin is carcinogenic and, as a cross-linked agent, disadvantageously influences the pot life of the coating masses.

EP-OS 312 638 requires, on the other hand, a styrene/butadiene/methacrylate therpolymer latex as a binder which, in connection with the hydrophilic components the silica and the organic polyacid, shows still better results, particularly in "tar stain". The back coating which results in accordance with this patent application is less hydrophilic than the back coating in accordance with DE-OS 37 00 183 and it has advantages in regard to its ability to be written on by pencil.

However, all the solutions described have recently proven to be inadequate. Because of the use of developer capacities which are becoming more intense, the pot lives (alternating cycle) of the photographic baths are becoming longer, and tar-like and strongly colored oxidation products increasingly exist in the photographic development baths. As the result, ever higher demands are consequently being placed on the photographic support materials, particularly in regard to "tar stain" and surface discoloration.

It is thus the task of the invention to provide coating masses for back coating of support materials for light sensitive layers which, after passing through strongly aged photographic treatment baths, show distinctly less contamination by tar-like oxidation products from the photographic developer baths ("tar stain") and distinctly less discoloration through oxidizing developer components absorbed on the surface than is the case in the present state of the art. In this, it is a basic condition that the layers have in comparison with the state of the art, no deterioration of the antistatic characteristics, writability and printability, adhesive tape adhesion, as well as resistance to abrasion and to the developer baths.

This task is solved by means of a layer of a coating mass for the production of this layer which is formed, at the minimum, of the following:
A colloidal aluminum modified silica;
An alkali salt of an organic polyacid; and
A styrene/butadiene copolymer latex which has the following characteristics:
  Styrene:butadiene ratio=70:30 to 50:50;
  Carboxyl group content in the polymer=0.5 to 3.0 mol %;
  Residual monomer content in the dispersion<200 ppm;
  Surface tension of the dispersion (30 wt %)>45 dyn/cm.

Latex dispersions which contain nonionic or anionic emulsifiers, such as sulfonated fatty acids, the particle size of which lies in the range of from 500 to 3,000 nm have, in particular, proven effective.

In one particularly preferred form, both the coating mass as well as the back coating additionally contain silica with a particle size ranging from 2 to 6 $\mu$m.

In one additional preferred form, the composition of the finished back coating which is applied to the photographic support and dried is selected so that its interfacial surface tension is >50 dyn/cm.

The particularly good research results of these reverse side layers were surprising since, first of all, in DE-OS 3 700 183 through the selection of a plastic dispersion (latex) with free carboxyl and preferably free hydroxyl groups of a total of up to 25 mol %, there was achieved an improvement relative to the state of the art, that is to say relative to corresponding plastic dispersions without this high content of hydrophilic groups. Then in EP-OS 312 638 a layer with a latex without free carboxyl and hydroxyl groups was described which brought about a further improvement of the state of the art, particularly in the "tar stain". In the present invention this now produces another latex with a low content of carboxyl groups of from 0.5 to 3.0 mol % and specific colloid chemical characteristics—an additional distinct improvement, particularly in regard to the "tar stain" with strongly aged developer solutions.

Extensive investigations have shown that in addition to the composition of the coating mass and the type of the latex copolymers, the surface tension of the latex, as well as the interfacial surface tension of the back side coating, are also of particular significance. In particular, the surface and interfacial surface tensions influence the "tar stain", the discoloration (yellowing) through absorbed, oxidized developer components, and the resistance of the layer to abrasion and to the developer baths. A styrene/butadiene dispersion has, in particular, proven effective. The residual monomer content of these lattices should preferably be <200 ppm.

The mass ratios of the individual components to one another amount in accordance with the invention, to the following:

|  | WITHIN THE COATING MASS | WITHIN THE LAYER |
|---|---|---|
| Aluminum modified colloidal silica | 3–8 wt % as 30 wt % aqueous dispersion | 10–40 wt % |
| Alkali salt of an organic polyacid | 0.5–2 wt % as 30 wt % aqueous solution | 3–10 wt % |
| Styrene/butadiene copolymer | 7–9 wt % as 50 wt % aqueous dispersion | 50–85 wt % |
| Preferably: silica of 2–6 μm particle size | 2–10 wt % as 10 wt % aqueous dispersion | 3–20 wt % |
| Water | Remainder up to 100 wt % | In equilibrium with the environmental moisture |

Note: The styrene/butadiene copolymer has a surface tension of >45 dyn/cm as a diluted 30 wt % aqueous latex dispersion.
The dried layer on the reverse side of the photographic support material has an interfacial surface tension of >50 dyn/cm.

The aluminum modified silica in the coating mass, as a colloidal solution, has a particle size of 7–16 nm, and the modification preferably consists of the exchange of a few silicon atoms by aluminum atoms.

The alkali salt of an organic polyacid can be a lithium, sodium or potassium salt of polyacrylic or polymethacrylic acid, maleinic acid, itaconic acid, crotonic acid, polysulfonic acid or mix polymers of these compounds, as well as cellulose derivatives. The alkali salts of polystyrene sulfonic acid, naphthalene sulfonic acid or an alkali cellulose sulfate are preferable.

The coating mass and the back coating can additionally contain small quantities of optical brighteners, nuancing coloring agents, antioxidants, slip, wetting agents and the like.

All usual systems are suited as application aggregates for the coating masses. The surface of the photographic support material to be coated is preferably treated in advance by means of corona discharge in order to attain a better adhesion of the layer applied.

The following examples should illustrate the invention in greater detail, but not restrict it.

EXAMPLE 1

A support material consisting of a hard sized base paper of 175 g/m² basis weight and 30 g/m² polyethylene with 11 wt % of titanium dioxide on the front side and 35 g/m² of polyethylene on the reverse side, was coated on the reverse side with the coating masses set forth in Table 1.

After a surface treatment of the support material by means of a corona discharge, the coating masses were applied with a roll coater system onto the surface to be coated, proportioned with a doctor bar and dried in a hot air channel with air temperatures of approximately 130° C. The operating speed was 100 m/min. The dry coating weight was 1.0 g/m² ±0.1 g/m².

TABLE 1

Coating Masses In Accordance With Example 1

| Example | 1a | 1b | 1c | 1d | 1e | 1f |
|---|---|---|---|---|---|---|
| Colloidal, aluminum modified silica, 30 wt % in water (Ludox AM)* | 4.0 | 4.0 | 4.0 | 6.0 | 5.0 | 6.0 |
| Sodium polystyrene sulfonate, 30 wt % in water | 1.0 | — | — | 0.8 | 1.6 | 1.0 |
| Sodium naphthalene trisulfonate, 30 wt % in water | — | 1.0 | — | — | — | — |
| Sodium cellulose sulfate, 10 wt % in water | — | — | 3.0 | — | — | — |
| Styrene/butadiene copolymer 1*, 50 wt % dispersion in water | 7.5 | 7.5 | 7.5 | — | — | — |
| Styrene/butadiene copolymer 2*, 48 wt % dispersion in water | — | — | — | 8.5 | 8.5 | 8.5 |
| Silica (particle size of 3–6 μm), 10 wt % in water | 4.5 | 6.5 | 8.5 | — | 6.5 | 6.5 |
| Wetting agent, 10 wt % in water/methanol = 1:1 | 1.0 | 1.0 | 1.0 | 1.0 | 1.0 | 1.0 |
| Demineralized water | 82.0 | 80.0 | 76.0 | 83.7 | 77.4 | 77.0 |

*Ludox AM = Product of the E.I. Du Pont de Nemour & Co.
*Copolymers (as latex dispersion).

|  | Copolymer 1 | Copolymer 2 |
|---|---|---|
| Styrene/butadiene ratio | 60:40 | 55:45 |
| Carboxyl group content in the copolymer (mol %) | Approx. 2 | Approx. 1 |
| Average particle size of the dispersion (nm) | 2,000 | 800 |
| Emulsifier system | Anionically sulfonated | Anionically sulfonated |
| Residual monomer | 100–200 | 100–200 |
| Surface tension of a 30 wt % dilution (dyn/cm) (DIN 53914) | 47 | 50 |

COMPARATIVE EXAMPLES VI

The same support material as in Example 1 was, under the same conditions as in Example 1, coated with the coating masses set forth in Table 2;

TABLE 2

Coating Masses In Accordance With Comparison V1

| Comparative Example | V1a | V1b |
|---|---|---|
| Corresponds |  |  |
| Example | 4 | 5 |
| From | DE-OS 3700183 | DE-OS 3735871 |
| Colloidal, aluminum-modified silica | 10 wt % | 10 wt % |
| Copolymer 3*, 30% dispersion in water | 10 wt % | — |
| Copolymer 4*, 45% dispersion in water | — | 22 wt % |
| Trifunctional aziridin 50% in isopropanol | 0.1 wt % | — |
| Sodium naphthalene trisulfonate, 30% in water | 5.0 wt % | — |
| Sodium polystyrene sulfonate, 30% in water | — | 2 wt % |
| Silica, 3–6 μm particle size, 10% in water | — | 10 wt % |
| Ammonia solution, up to pH | 8.4 | — |
| Water alcohol mixture (10:1) | 75 wt % | 56 wt % |
| Coating weight, dry (g/m²) | 0.8 | 1.5 |

*Copolymer 3 = Butylacrylate:methylmethacrylate:methacrylic acid:hydroxyethylate = 68:10:2:20. Surface tension of a 30 wt % dilution = 45 dyn/cm.
*Copolymer 4 = Styrene:butadiene:methylmethacrylate = 62:30:8. Surface tension of a 30 wt % dilution = 39 dyn/cm.

COMPARATIVE EXAMPLES V2

The same support material as in Example 1 under the same conditions as Example 1 was coated with the coating masses set forth in Table 3:

TABLE 3

Coating Masses In Accordance With Comparison V2

| Comparative Example | V2a | V2b | V2c |
| --- | --- | --- | --- |
| Colloidal aluminum modified silica as in Example 1 | 5.0 wt % | 5.0 wt % | 5.0 wt % |
| Sodium polystyrene sulfonate as in Example 1 | 1.6 wt % | 1.6 wt % | 1.6 wt % |
| Styrene/butadiene copolymer 5*, 48 wt % dispersion in water | 8.5 wt % | — | — |
| Styrene/butadiene copolymer 6*, 48 wt % dispersion in water | — | 8.5 wt % | — |
| Styrene/butadiene copolymer 7*, 50 wt % dispersion in water | — | — | 8.16 wt % |
| Silica, as in Example 1 | 6.5 wt % | 6.5 wt % | 6.5 wt % |
| Wetting agent solution as in Example 1 | 1.0 wt % | 1.0 wt % | 1.0 wt % |
| Demineralized water | 77.4 wt % | 77.4 wt % | 77.4 wt % |

*Styrol/butadiene copolymers (as latex dispersion)

|  | Copolymer 5 | Copolymer 6 | Copolymer 7 |
| --- | --- | --- | --- |
| Styrene/butadiene ratio | 60:40 | 50:50 | 70:30 |
| Carboxyl group content in polymer | 0 | <0.5 mol % | Approx. 1 mol % |
| Average particle size of the dispersion | 200 nm | 1000 nm | 1000 nm |
| Emulsifier system | anionic | anionic | anionic |
| Surface tension of a DIN 53914 30 wt % dilution | 38 dyn/cm | 44 dyn/cm | 42 dyn/cm |

The finished samples were subjected to the following tests:

The surface resistance was measured, before and after a photographic developing process, in accordance with DIN 53 482.

For the adhesion tape adhesion, an adhesive tape of the type which is commercially commonly available was used, such as for example a 3M adhesive tape 8422. The adhesive tape was pressed onto the back coating and stressed with a weight of 3 kg. Subsequently, the sample adhered with the adhesive tape was cut into strips 1.5 cm wide, and the adhesive tape was stripped away from the sample in a breaking load tester at an angle of 180° at a speed of 20 cm/min. The force needed for the stripping away was measured.

In the "tar stain" test (dirt absorption), different color developers from Europe, Japan and the USA of the type which are commonly commercially available, were filled to approximately the level of 2 cm high into an open shell and left exposed to the air for one week. After this time, a dark, tar-like layer of oxidation products was formed on the surface. The sample to be tested, which was kept slightly curved, was drawn over this tar-like surface layer so that a close contact of the sample with the tar was insured. Subsequently, the sample was washed under flowing water and dried in the air. The dirt which remained in adhesion was visually evaluated as a measure for a "tar stain" (dirt absorption) of the layer to be tested.

The discoloration of the back coating through the photographic development process was visually evaluated after the passage of the samples through the automatic developing machines and the subsequent storing of the samples for 4 days with entrance of air at room temperatures.

The test of the printability (print image after effect of baths) and the resistance to abrasion or baths was carried out by means of samples of color bands of the type commercially available. For the testing of the resistance of the print images to chemical and mechanical stresses of the type which can arise during the developing process, the print patterns were immersed for 30 seconds in a developer of the commercially conventional type. After that, the samples were lightly rubbed over by finger and rinsed off with water. For the evaluation of the printability, smudges or discolorations which can arise through the washing out of the color components were investigated.

For the writing properties test with pencils, the back coating was written on with pencils of the harness types 3B, HB and 2H. The legibility of the lettering was evaluated in a comparative manner.

The interfacial surface tension was determined by means of a brushing on of test solutions of known surface tension onto the layer to be tested. The value of the test solution with the highest surface tension which moistens the layer to be tested over its full surface for at least 2 seconds, is stated as the interfacial surface tension in dyn/cm.

The results of all the tests have bee summarized in Table 4.

TABLE 4a

| Example | 1a | 1b | 1c | 1d | 1e | 1f |
| --- | --- | --- | --- | --- | --- | --- |
| Surface resistance, $\Omega/cm^2$: | | | | | | |
| Before the development process | $7.10^9$ | $8.10^9$ | $7.10^9$ | $6.10^9$ | $3.10^9$ | $5.10^9$ |
| After the development process | $9.10^{10}$ | $9.10^{10}$ | $8.10^{10}$ | $8.10^{10}$ | $6.10^{10}$ | $6.10^{10}$ |
| Adhesive tape adhesion, KNm | 2.6 | 2.7 | 2.7 | 2.9 | 2.4 | 2.6 |
| Tar stain, developer from: | | | | | | |
| Europe | Very Good | Very Good | Very Good | Very Good | Very Good | Very Good |
| Japan | Very Good | Very Good | Very Good | Very Good | Very Good | Very Good |
| USA | Very Good | Very Good | Very Good | Very Good | Very Good | Very Good |
| Discoloration through the developer | Very Slight | Very Slight | Very Slight | Very Slight | Very Slight | Very Slight |
| Printability | Good | Good | Good | Good | Good | Good |
| Abrasion and bath resistance | Good | Good | Good | Good | Good | Good |
| Writing properties with pencil | Good | Good | Good | Good | Good | Good |
| Interfacial surface tension, dyn/cm | >56 | >56 | >56 | 51 | 52 | 52 |

TABLE 4b

| Example | Test Results | | | | |
|---|---|---|---|---|---|
| | V1a | V1b | V2a | V2b | V2c |
| Surface resistance, $\Omega/cm^2$: | | | | | |
| Before the development process | $4.10^9$ | $7.10^9$ | $7.10^9$ | $1.10^{10}$ | $8.10^9$ |
| After the development process | $9.10^{10}$ | $1.10^{11}$ | $1.10^{11}$ | $2.10^{11}$ | $9.10^{10}$ |
| Adhesive tape adhesion, KNm | 2.4 | 2.7 | 2.8 | 2.6 | 2.6 |
| Tar stain, developer from: | | | | | |
| Europe | Average-good | Good | Poor | Good | Good |
| Japan | Poor | Good | Poor | Average | Average |
| USA | Poor | Average | Poor | Average | Average |
| Discoloration through the developer | Slight | Slight | Distinct | Slight | Slight |
| Printability | Good | Good | Good | Good | Good |
| Abrasion and bath resistance | Average-poor | Good | Average | Average | Average |
| Writing properties with pencil | Poor | Good | Good | Good | Good |
| Interfacial surface tension, dyn/cm | 44 | 49 | 42 | 49 | 48 |

The back coating layer in accordance with the invention is characterized in particular by a pronounced inert behavior relative to photographic developer solutions, as well as in relation to their oxidation products. This is distinctly notable in the "tar stain" and in the "discoloration through photographic developer".

The drawing FIG. 1 shows these dependencies and establishes the required surface tension for the styrene/butadiene copolymer lattices and the required interfacial surface tension of the dried coating masses.

We claim:

1. A coating composition for the production of a layer on the reverse side of photographic support materials, which composition includes at least an aluminum modified colloidal silica, an alkali salt of an organic polyacid, and a styrene/butadiene copolymer latex in effective amounts for said reverse side coating, and wherein the improvement in said coating composition comprises an aqueous dispersion of said styrene/butadiene copolymer latex having carboxyl groups therein, said aqueous dispersion having the following parameters: the styrene:butadiene ratio being about 50:50 to 70:30; the carboxyl group content being about 0.5 to 3.0 mol %; the residual monomer content being <200 ppm; and the surface tension at a 30 wt % dilution being >45 dyn/cm.

2. The coating composition of claim 1, wherein the average particle size of the styrene/butadiene copolymer dispersion is between about 500 and 3,000 nm.

3. The coating composition of claim 1, wherein the styrene/butadiene copolymer dispersion includes a nonionic or anionic emulsifier system.

4. The coating composition of claim 2, wherein the styrene/butadiene copolymer dispersion includes a nonionic or anionic emulsifier system.

5. The coating composition of claim 1, wherein the mass portions of the components are as follows: the colloidal aluminum modified silica as a 30 wt % dispersion in water is about 3 to 8 wt %; the alkali salt of an organic polyacid as a 30 wt % aqueous solution is about 0.5 to 2.0 wt %; the styrene/butadiene copolymer dispersion as a 50 wt % dispersion in water is about 7 to 9 wt %; and the remainder of water, if necessary with wetting agents, is up to 100 wt %.

6. The coating composition of claim 1, including about 0.2-1.0 wt % silica of 2-6 μm particle size.

7. The coating composition of claim 5, including about 0.2-1.0 wt % silica of 2-6 μm particle size.

8. The coating composition of claim 1, including up to about 2 wt % solids of auxiliary agents from the group consisting essentially of optical brighteners, white pigments, coloring agents, dispersal and wetting agents and antioxidants.

9. The coating composition of claim 5, including up to about 2 wt % solids of auxiliary agents from the group consisting essentially of optical brighteners, white pigments, coloring agents, dispersal and wetting agents and antioxidants.

10. The coating composition of claim 6, including up to about 2 wt % solids of auxiliary agents from the group consisting essentially of optical brighteners, white pigments, coloring agents, dispersal and wetting agents and antioxidants.

* * * * *

UNITED STATES PATENT AND TRADEMARK OFFICE
CERTIFICATE OF CORRECTION

PATENT NO. : 5,232,824

DATED : August 3, 1993

INVENTOR(S) : Eckehard Saverin and Hans-Udo Tyrakowski

It is certified that error appears in the above-indentified patent and that said Letters Patent is hereby corrected as shown below:

Col. 3, line 57, "therpolymer" should read --terpolymer--.
Col. 6, line 38, "Table 2;" should read --Table 2:--.

Signed and Sealed this

Ninth Day of May, 1995

Attest:

BRUCE LEHMAN

Attesting Officer

Commissioner of Patents and Trademarks